(12) United States Patent
Huang (10) Patent No.: US 8,786,170 B2
(45) Date of Patent: Jul. 22, 2014

(54) OPTICAL SYSTEM FOR PROVIDING TELECENTRIC LIGHT BEAM

(75) Inventor: June-Jei Huang, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 140 days.

(21) Appl. No.: 13/214,812

(22) Filed: Aug. 22, 2011

(65) Prior Publication Data

US 2012/0051049 A1    Mar. 1, 2012

Related U.S. Application Data

(60) Provisional application No. 61/376,442, filed on Aug. 24, 2010.

(30) Foreign Application Priority Data

May 23, 2011    (TW) .............................. 100117916 A (51) Int. Cl.
| | |
|---|---|
| *F21V 11/00* | (2006.01) |
| *G02B 27/09* | (2006.01) |
| *G03B 21/20* | (2006.01) |
| *G03B 21/00* | (2006.01) |

(52) U.S. Cl.
CPC ........ *G02B 27/0927* (2013.01); *G03B 21/2013* (2013.01); *G02B 27/0961* (2013.01); *G03B 21/008* (2013.01); *G03B 21/2033* (2013.01)
USPC .......................................................... 313/235

(58) Field of Classification Search
CPC .................................................. G02B 27/0961
USPC .......................................................... 362/235
See application file for complete search history.

(56) References Cited

U.S. PATENT DOCUMENTS

| | | | |
|---|---|---|---|
| 6,193,393 B1 * | 2/2001 | Dove et al. ...................... | 362/19 |
| 6,513,953 B1 | 2/2003 | Itoh | |

(Continued)

FOREIGN PATENT DOCUMENTS

| | | |
|---|---|---|
| CN | 101278558 | 10/2008 |
| JP | 11-64788 | 3/1999 |

(Continued)

OTHER PUBLICATIONS

Office Action from Chinese Application No. 201110150299.5 dated Oct. 10, 2012. English translation of relevant portions attached.
Office Action from Chinese Application No. 201110150299.5 dated Jun. 28, 2013. English translation of relevant portion attached.
Office Action from Taiwanese Application No. 100117916 dated May 7, 2013. English translation of relevant portions attached.

*Primary Examiner* — Anh Mai
*Assistant Examiner* — Hana Featherly
(74) *Attorney, Agent, or Firm* — Grossman, Tucker, Perreault & Pfleger, PLLC (57) ABSTRACT

An optical system, including a light source module, a first lens array and a second lens array, is disclosed. The first lens array is located on one side of the light source module and includes first lenses. The first lenses are arranged according to a first pattern which is non-radially symmetrical and has a first major axis. The second lens array is located on one side of the first lens array and includes second lenses. The second lenses are arranged according to a second pattern and have optical axes aligned with optical axes of the first lenses. The second pattern is non-radially symmetrical and has a second major axis which deflects from the first major axis by a first angle. With this arrangement, the light source module can provide a telecentric light beam formed by radially symmetrical light cones, and the first and second lens arrays can transform this telecentric light beam into a light beam with non-radially symmetrical light cones illuminated onto a target area.

12 Claims, 13 Drawing Sheets

(56) References Cited

U.S. PATENT DOCUMENTS

| | | |
|---|---|---|
| 6,987,546 B2 | 1/2006 | Ouchi et al. |
| 7,101,050 B2 | 9/2006 | Magarill et al. |
| 7,232,227 B2 | 6/2007 | Yamasaki et al. |
| 7,246,923 B2 | 7/2007 | Conner |
| 7,258,450 B2 | 8/2007 | Koyama et al. |
| 7,278,755 B2 | 10/2007 | Inamoto |
| 7,438,423 B2 | 10/2008 | Conner |
| 7,686,459 B2 | 3/2010 | Inoko et al. |
| 2003/0169376 A1* | 9/2003 | Ouchi et al. .......... 348/744 |
| 2004/0196443 A1 | 10/2004 | Tomita et al. |
| 2008/0316439 A1* | 12/2008 | Conner .......... 353/97 |

FOREIGN PATENT DOCUMENTS

| | | |
|---|---|---|
| JP | 2007-3744 | 1/2007 |
| TW | 552463 | 9/2003 |
| TW | 200538778 | 12/2005 |
| TW | I287687 | 10/2007 |
| TW | M385719 | 8/2010 |

* cited by examiner (Prior Art)

OPTICAL SYSTEM FOR PROVIDING TELECENTRIC LIGHT BEAM

CROSS-REFERENCES TO RELATED APPLICATIONS

This application claims priority benefit of U.S. Provisional Patent Application No. 61/376,442 filed on Aug. 24, 2010, and Taiwan Patent Application No. 100117916 filed on May 23, 2011, which are hereby incorporated herein by reference in its entirety.

BACKGROUND OF THE INVENTION

1. Field of the Invention

The present invention provides an optical system, and more particularly, an optical system capable of generating a non-radially symmetrical light beam.

2. Descriptions of the Related Art

A digital light processing (DLP) projector generally comprises an optical system, a digital micromirror device (DMD) and a projection lens assembly. The optical system is adapted to generate an incident light beam to be projected to the DMD. The DMD comprises a plurality of micromirrors. The incident light beam projected to the micromirrors is reflected by the micromirrors. By controlling the deflecting angle of each of the micromirrors, specific parts of the incident light beam can be selected to project and reflect onto the projection lens assembly.

Figure 1:
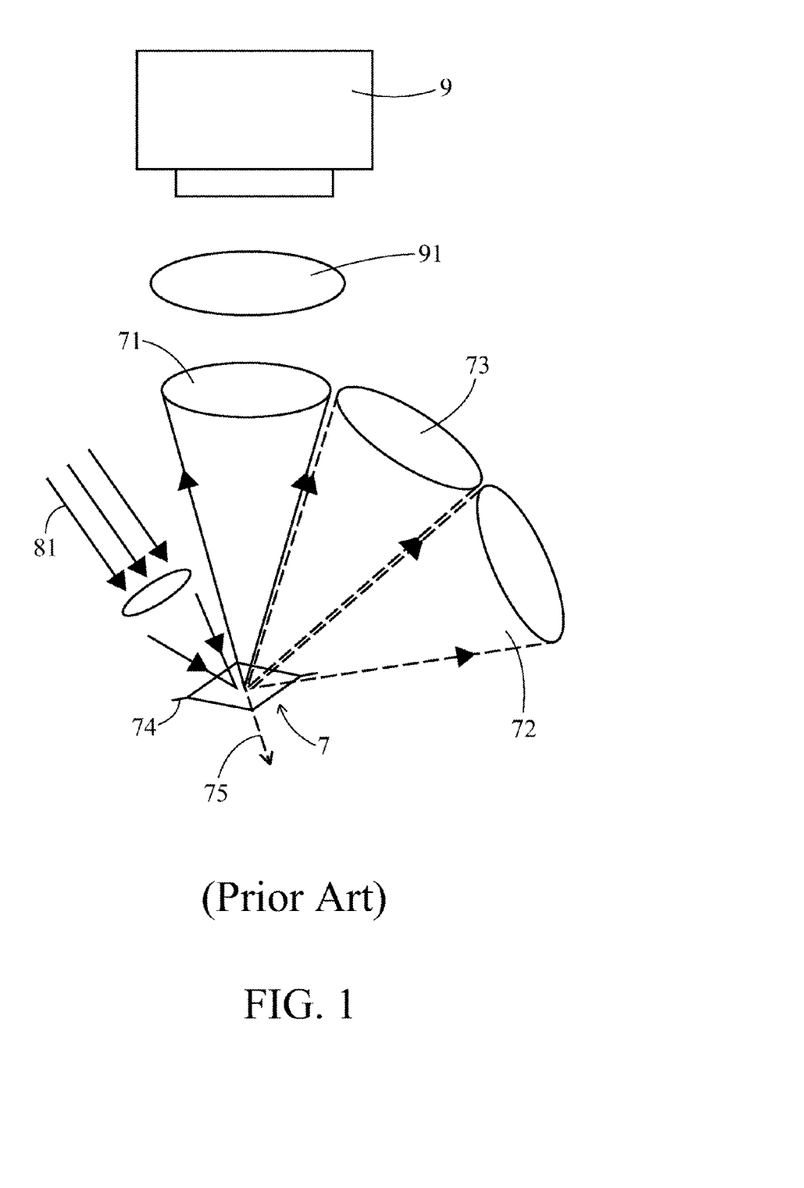
FIG. 1 is a schematic view of an optical system, a micromirror and a projection lens assembly in the prior art.

Furthermore, in reference to FIG. 1, each micromirror 7 of the DMD has two statuses: an On status and an Off status, which are distinguished by the tilt angle of the micromirror 7. The micromirror 7 has a tilt angle of about 12° in the On status and a tilt angle of about −12° in the Off status. An incident light beam 81 generated by the optical system is reflected by the micromirror 7 into a first reflected light beam 71 and a second reflected light beam 72 with different directions in different statuses respectively.

Furthermore, the incident light beam 81 also illuminates the planar structure of the DMD (e.g., the plane between two adjacent micromirrors 7, not shown in the figure) and is then reflected by the planar structure into another reflected light beam which is called a stray light 73.

Ideally, only the first reflected light beam 71 corresponding to the On status can propagate through the aperture 91 of the projection lens assembly 9 into the projection lens assembly 9 and is projected outwards by the projection lens assembly 9, while the second reflected light beam 72 and the stray light 73 cannot propagate through the aperture 91. However, in practice, a part of the stray light 73 may also propagate into the projection lens assembly 9 for the following reasons: the stray light 73 has too large of a divergence angle α in the direction 75 perpendicular to the rotation axis 74 of the micromirror 7, so the stray light 73 can propagate into the aperture 91 in the same direction 75. The situation would decrease the contrast of images projected by the projection lens assembly 9.

In order to overcome this shortcoming, some solutions have been proposed, for example, in U.S. Pat. No. 7,246,923 and U.S. Pat. No. 7,101,050. In these solutions, a non-radially symmetrical light beam can be generated by the optical system to illuminate the DMD so that the reflected light beams reflected by the micromirrors and the stray light reflected by the planar structure are all non-radially symmetrical; and in this case, the aperture of the projection lens assembly is also non-radially symmetrical.

The non-radially symmetrical reflected light beams and stray light all have a small divergence angle in a direction (e.g., the direction 75 shown in FIG. 1) perpendicular to the rotation axis of the micromirror. As a result, the stray light is less likely to propagate into the aperture of the projection lens assembly and, accordingly, the contrast of images projected by the projection lens assembly can be improved.

On the other hand, in the direction parallel to the rotation axis of the micromirror, the non-radially symmetrical reflected light beams have a relatively large divergence angle, so the reflected light beams have a relatively large Etendue. Consequently, in the On status, the reflected light beams with a relatively large Etendue can propagate into the aperture to result in an improved brightness of the images projected by the projection lens assembly.

In other words, the non-radially symmetrical nature of the light beams generated by the optical system is beneficial to both the contrast and the brightness of the images projected by the projection lens assembly.

However, in the aforesaid solutions, some special optical components such as a collector or an integrator are used in the optical system, which may increase the manufacturing cost of the optical system.

In view of this, an urgent need exists in the art to provide an optical system that can overcome the shortcoming described above.

SUMMARY OF THE INVENTION

An objective of the present invention is to provide an optical system capable of generating a light beam comprised of non-radially symmetrical cone-shaped light rays without using special optical components.

To achieve this objective, the optical system disclosed in the present invention comprises: a light source module; a first lens array located at one side of the light source module and comprising a plurality of first lenses, wherein the first lenses are arranged according to a first pattern which is non-radially symmetrical and has a first major axis; and a second lens array located at one side of the first lens array that is opposite to the light source module and comprising a plurality of second lenses. The second lenses are arranged according to a second pattern and have optical axes aligned with optical axes of the first lenses, and the second pattern is non-radially symmetrical and has a second major axis which deflects from the first major axis by a first angle.

With this arrangement, the light source module is adapted to generate a telecentric light beam, with each light ray in the light beam being comprised of a radially symmetrical light cone. The first lens array and the second lens array can transform the telecentric light beam into a light beam comprised of non-radially symmetrical light cones for illuminating a target area.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

Figure 2:
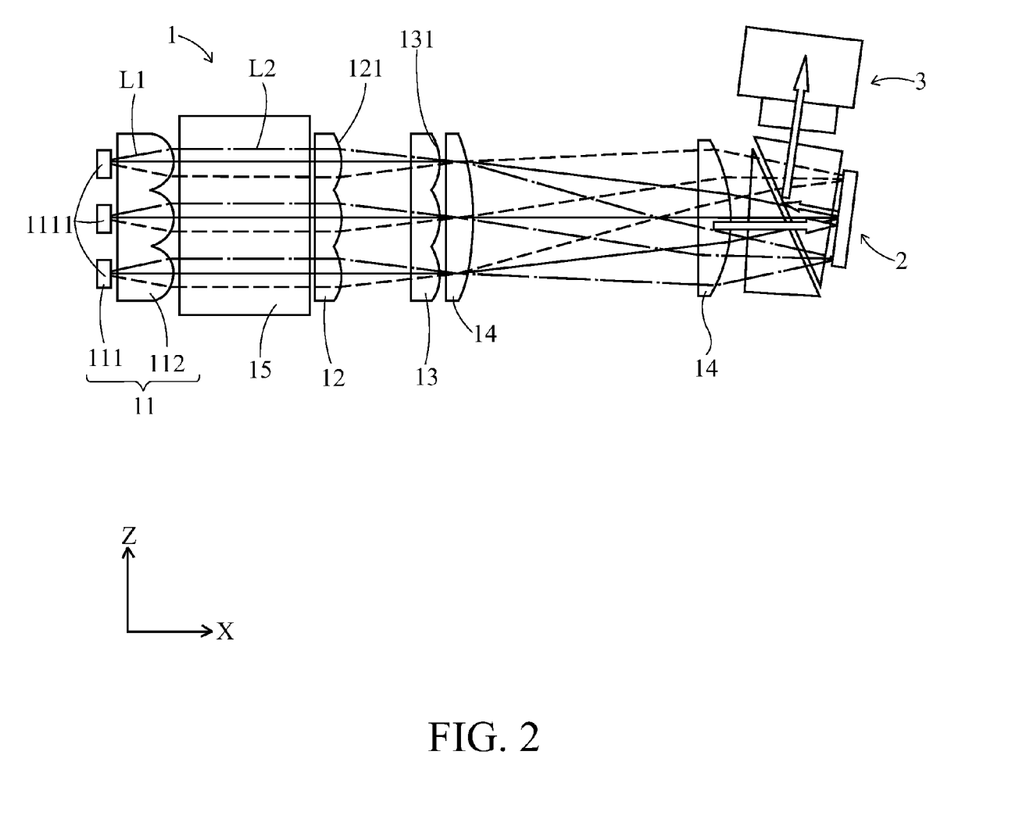
FIG. 2 is a schematic view illustrating the first preferred embodiment of an optical system of the present invention and the target area.

FIG. 2 illustrates a schematic view of the first preferred embodiment of an optical system of the present invention and a target area. The optical system 1 may comprise a light source module 11, a first lens array 12 and a second lens array 13.

The light source module 11 is adapted to generate a telecentric light beam, with each light ray of the light beam being comprised of a radially symmetrical light cone. The first lens array 12 and the second lens array 13 are adapted to have the telecentric light beam be redistributed and overlapped to form a light beam comprised of non-radially symmetrical light cones. For simplicity of description, the "light beam comprised of non-radially symmetrical light cones" will be called as a "non-radially symmetrical light beam" for short hereinafter.

Hereinafter, the components of the optical system 1 will be further described.

Figure 3:
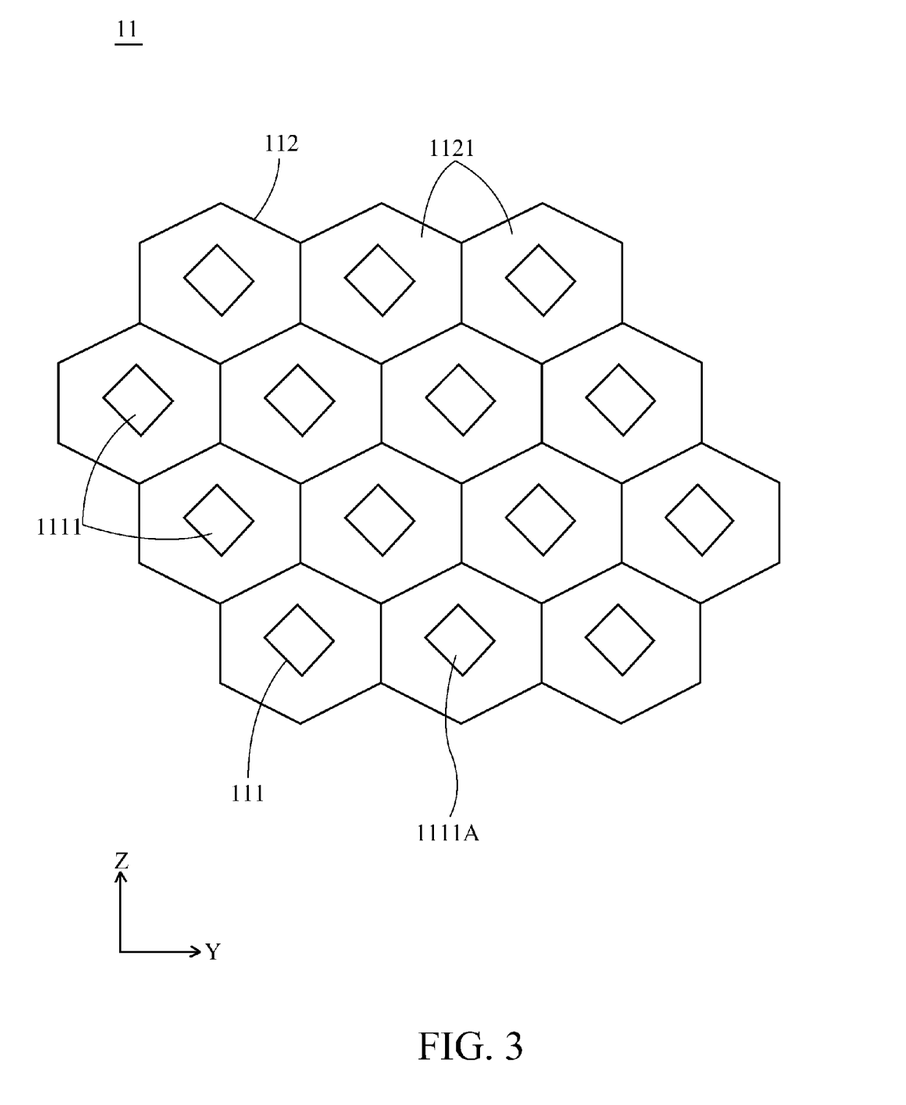
FIG. 3 is a schematic view of a light source module of the optical system shown in FIG. 2.

The light source module 11 may be configured, or formed, in a number of ways. In this embodiment, the light source module 11 comprises a light emitting diode (LED) array 111 and a collimating lens array 112. FIG. 3 illustrates a schematic view of the light source module of the optical system shown in FIG. 2. The LED array 111 comprises a plurality of LEDs 1111, each of which has a rectangular light emitting surface 1111A adapted to emit a light ray L1 (as shown in FIG. 2).

The light ray L1 emitted by the light emitting surface 1111A exhibits a maximum divergence angle up to 90° (depending on the type of the LED). To make it easy to collimate the light ray, an angle selective film may be applied on the light emitting surface 1111A so that only light rays L1 with a divergence angle smaller than 40° can pass through the angle selective film.

The collimating lens array 112 is located at a side of the LEDs 1111, i.e., is located in a light path of the light rays L1 emitted by the LEDs 1111. The collimating lens array 112 comprises a plurality of collimating lenses 1121 optically coupled with the LEDs 1111 respectively; that is, the light rays emitted by the LEDs 1111 can pass through the collimating lenses 1121. After passing through the collimating lenses 1121, the light rays L1 become directional light rays L2 as shown in FIG. 2.

It is worth noting that, in order to desirably cover the light rays L1 emitted by the LEDs 1111 so as to reduce the light loss, each of the collimating lenses 1121 may have a hexagonal cross section (which is approximate to a circular cross section). Furthermore, the number of the LEDs 1111 may not be necessarily the same as that of the collimating lenses 1121, and there may be only one LED 1111.

Although this embodiment is exemplified with a single light source module 11, the present invention is not merely limited thereto. In other embodiments (not shown), the optical system may comprise a plurality of (e.g., three) light source modules which can generate telecentric light beams of different colors (e.g., a red color, a yellow color and a green color) respectively. The telecentric light beams can be combined together by a combining optical component 15 and then transferred to the first lens array 12. In other words, if there is only a single light source module 11, then the combining optical component 15 can be omitted.

In reference to FIG. 2 again, the first lens array 12 is located at a side of the light source module 11 (the collimating lens array 112) to converge the telecentric light beam generated by the light source module 11 into the second lens array 13.

Figure 4:
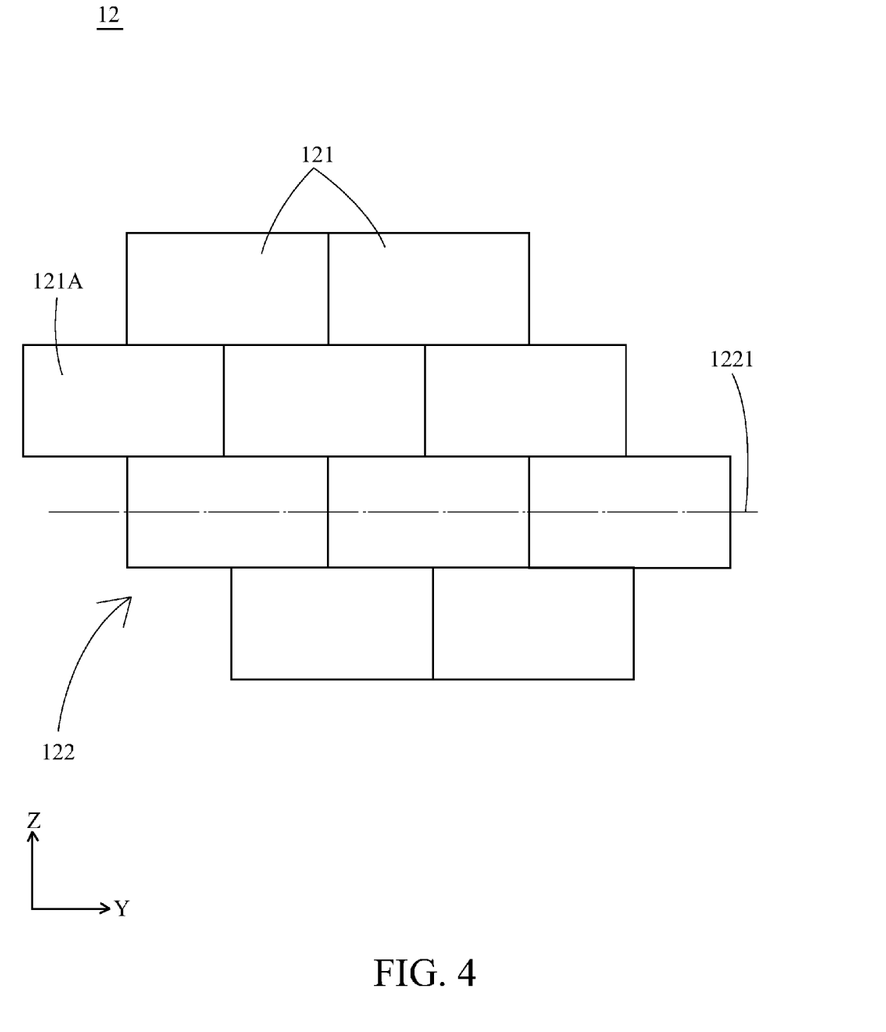
FIG. 4 is a schematic view of the first lens array of the optical system shown in FIG. 2.

The first lens array 12 comprises a plurality of first lenses 121, which may be condensing lenses such as planoconvex lenses or biconvex lenses. FIG. 4 illustrates a schematic view of the first lens array of the optical system shown in FIG. 2. The first lenses 121 each have a rectangular first cross section 121A, and are arranged according to a first pattern 122; that is, the first lenses 121 are arranged side by side with (or adjoin) each other so that the first cross sections 121A of the first lenses 121 jointly form the first pattern 122.

The first pattern 122 is non-radially symmetrical, which means that the first pattern 122 may be a non-circular pattern such as a rectangular pattern or an elliptical pattern. Therefore, the first cross sections 121A of the first lenses 121 jointly form a pattern like a rectangle or an ellipse. Furthermore, as being non-radially symmetrical, the first pattern 122 has a first major axis 1221. The first major axis 1221 represents a direction in which the first pattern 122 has a longer dimension, and is parallel with a side of the first cross section 121A of each first lens 121.

Figure 5:
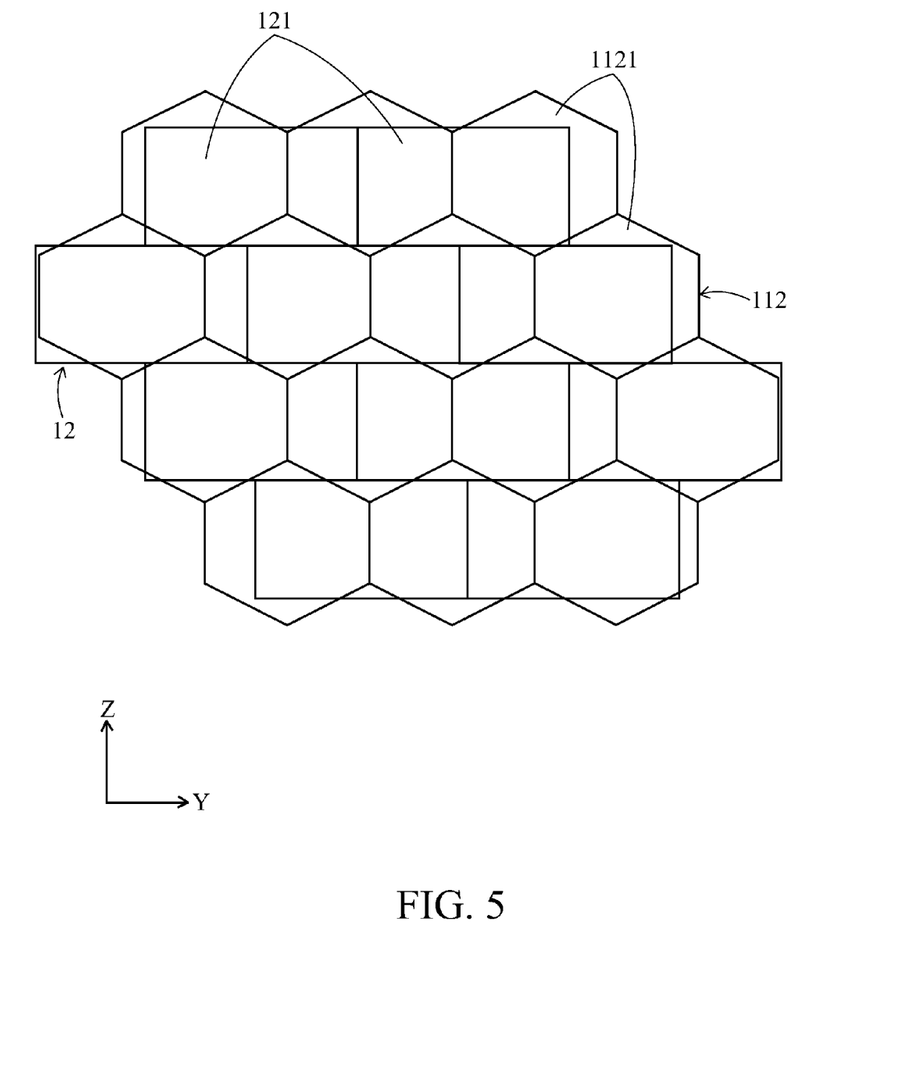
FIG. 5 is a schematic view illustrating the positional relationships between the collimating lens array and the first lens array shown in FIG. 2.

FIG. 5 illustrates another schematic view of the positional relationships between the collimating lens array and the first lens array shown in FIG. 2. As described above, the first lens array 12 is adapted to converge the telecentric light beam generated by the light source module 11 into the second lens array 13. Therefore, in order to reduce the light loss due to the failure of the telecentric light beam in passing through the first lens array 12, the collimating lenses 1121 of the collimating lens array 112 may be arranged close to the first pattern 122 so that most of the telecentric light beam from the collimating lens array 112 can propagate into the first lens array 12.

It is worth noting that the number of the collimating lenses 1121 may not be necessarily the same as that of the first lenses 121.

In reference to FIG. 2 again, the second lens array 13 is located at a side of the first lens array 12 to be opposite to the light source module 11; that is, the first lens array 12 is located between the second lens array 13 and the light source module 11. The second lens array 13 is adapted to have the light rays converged therein redistributed and overlapped to form a non-radially symmetrical light beam.

The second lens array 13 comprises a plurality of second lenses 131, which may be condensing lenses such as plano-convex lenses or biconvex lenses. The number of the second lenses 131 is the same as that of the first lenses 121, and the second lenses 131 are optically coupled to the first lenses 121 respectively; that is, the light rays from the first lenses 121 can propagate into the second lenses 131, or the optical axes of the second lenses 131 are aligned with optical axes of the first lenses 121.

Figure 6:
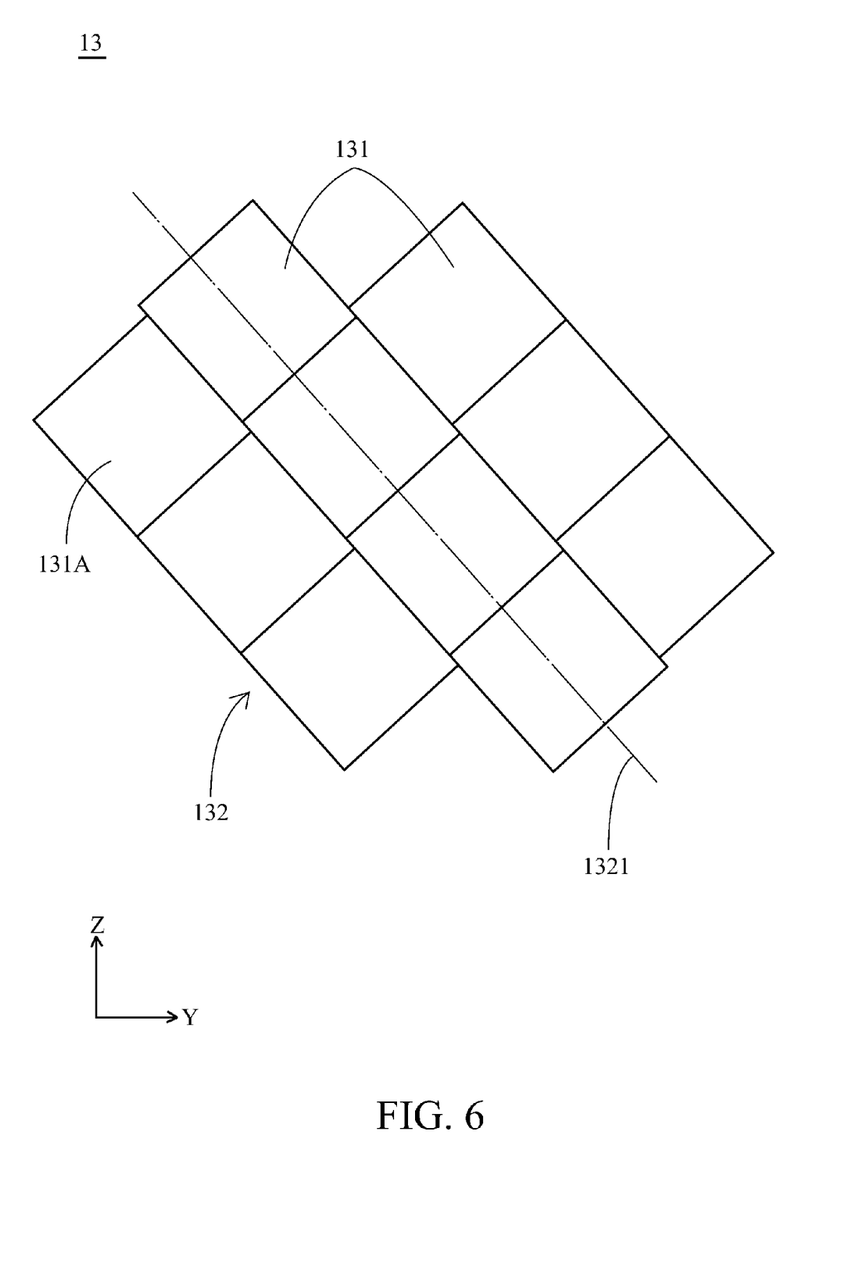
FIG. 6 is a schematic view of the second lens array of the optical system shown in FIG. 2.

FIG. 6 illustrates a schematic view of the second lens array of the optical system shown in FIG. 2. The second lenses 131 each have a rectangular second cross section 131A respectively, and are arranged according to a second pattern 132; that is, the second lenses 131 are arranged side by side with (or adjoin) each other so that the second cross sections 131A of the second lenses 131 jointly form the second pattern 132.

Similar to the first pattern 122, the second pattern 132 is also non-radially symmetrical, so the second cross sections 131A of the second lenses 131 form a pattern like a rectangle or an ellipse. Furthermore, the second pattern 132 has a second major axis 1321 representing a direction in which the second pattern 132 has a longer dimension; and the second major axis 1321 is parallel with a side of the second cross section 131A of each second lenses 131.

Figure 7:
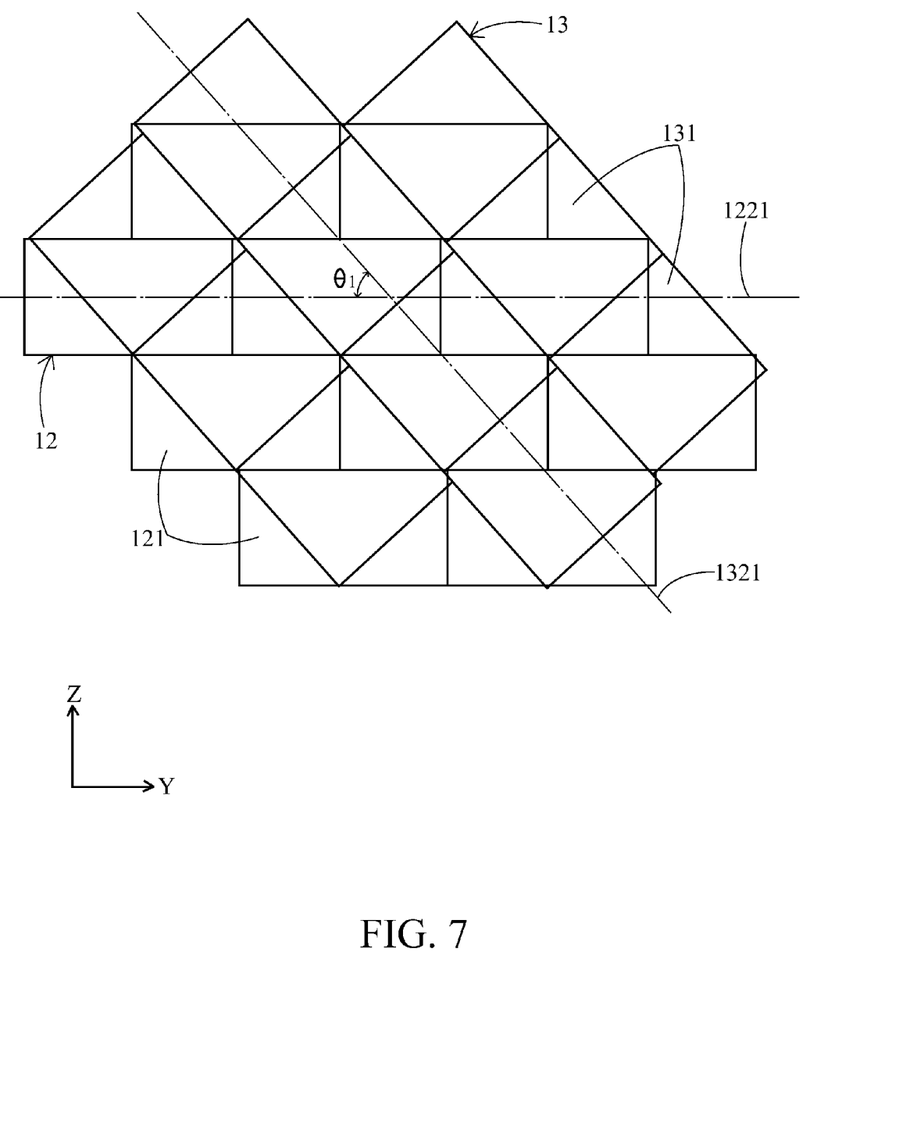
FIG. 7 is a schematic view illustrating the positional relationships between the first lens array and the second lens array shown in FIG. 2.

FIG. 7 illustrates a schematic view of the positional relationships between the first lens array and the second lens array shown in FIG. 2. The second major axis 1321 of the second pattern 132 deflects from the first major axis 1221 by a first angle $\theta_1$ so that each of the first lenses 121 also deflects from one of the second lenses 131 by the first angle $\theta_1$.

Figure 8:
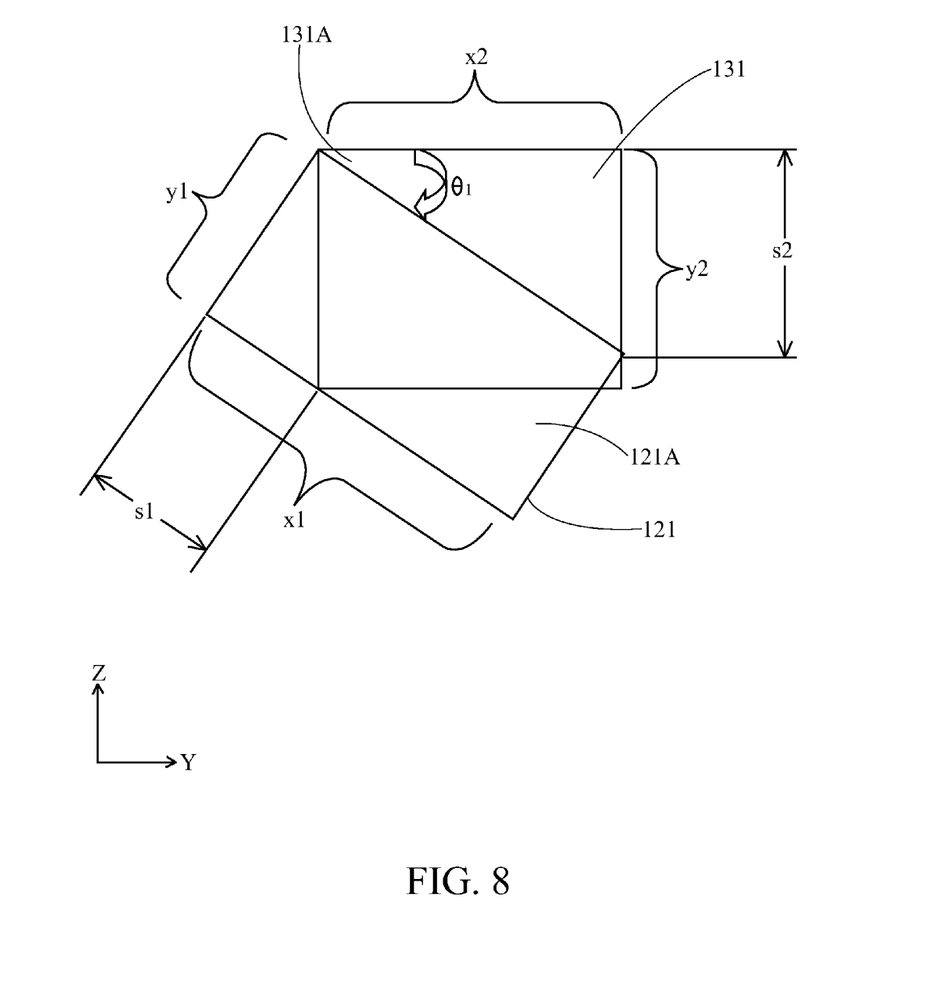
FIG. 8 is a schematic view illustrating the dimensional relationships between the first lens and second lens shown in FIG. 2.

FIG. 8 illustrates a schematic view of the dimensional relationships between the first lens and the second lens shown in FIG. 2. In order to reduce the light loss occurring when the first lenses 121 and the second lenses 131 are optically coupled to each other, the first cross section 121A of each of the first lenses 121 can be formed to have substantially the same area as that of the second cross section 131A of each of the first lenses 131 (differences may exist due to manufacturing tolerances or errors). A length x1 and a width y1 of the first cross section 121A, as well as a length x2 and a width y2 of the second cross section 131A, will satisfy the following equation (1):

$$\theta_1 = \cos^{-1}\left(\sqrt{\frac{x2 \cdot y1}{x1 \cdot y2}}\right) \quad (1)$$

Thus, when the length x1 and the width y1 of the first cross section 121A are known, the length x2 and the width y2 of the second cross section 131A can be obtained according to the equation (1).

When the equation (1) is satisfied, a row of the first lens array 12 experiences a first offset s1, and a column of the second lens array 13 experiences a second offset s2. The first offset s1, the width y1 of the first cross section 121A and the first angle $\theta_1$ have the relationship of s1=y1·tan $\theta_1$; and the second offset s2, the length x2 of the second cross section 131A and the first angle $\theta_1$ have the relationship of s2=x2·tan $\theta_1$.

Figure 9:
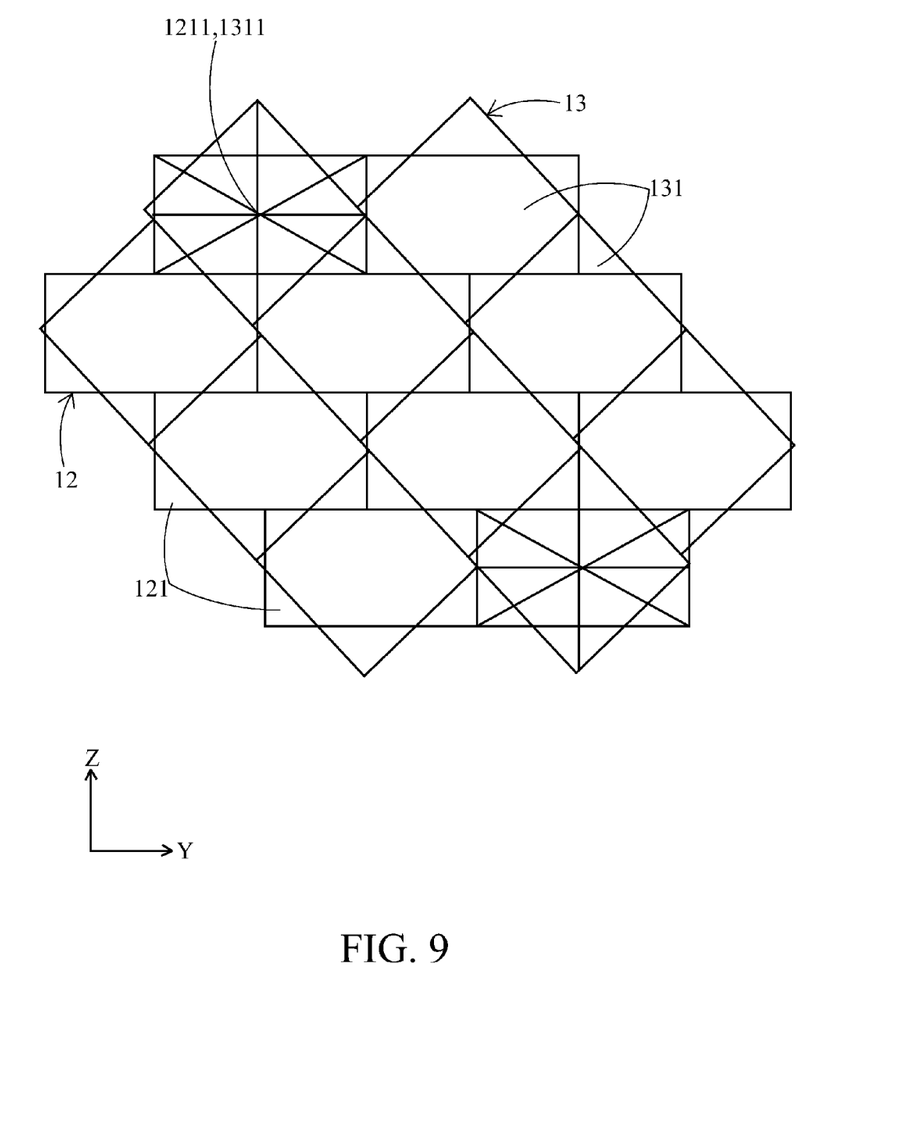
FIG. 9 is another schematic view illustrating the positional relationships between the first lens array and the second lens array shown in FIG. 2.

FIG. 9 illustrates another schematic view of the positional relationships between the first lens array and the second lens array shown in FIG. 2. On the other hand, when the equation (1) is satisfied, a center 1211 of each of the first lenses 121 of the first lens array 12 will be aligned with a center 1311 of one of the second lenses 131 of the second lens array 13 so as to further reduce the light loss.

In reference to FIG. 2 again, as the first lens array 12 and the second lens array 13 deflect from each other, the telecentric light beam generated by the light source module 11 can be transformed into a light beam comprised of non-radially symmetrical light cones. Thereafter, the optical system 1 can project the light beam comprised of non-radially symmetrical light cones onto the target area 2 via a plurality of relay lenses 14.

Figure 10:
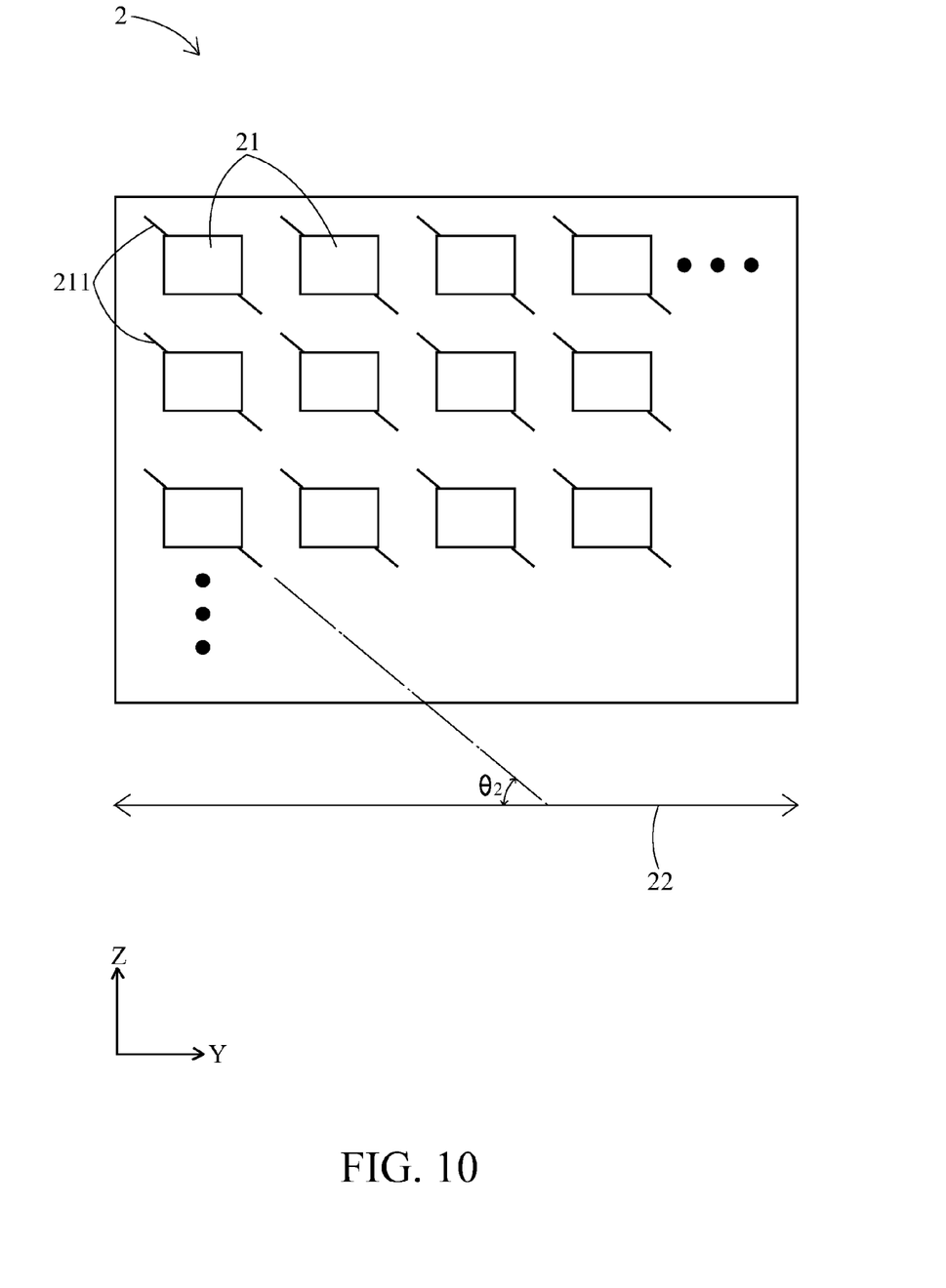
FIG. 10 is a schematic view of the target area shown in FIG. 2.

FIG. 10 illustrates the schematic view of the target area shown in FIG. 2. The target area 2 may be any area that can provide benefits when being illuminated by the non-radially symmetrical light beam. In this embodiment, the target area 2 is formed by a plurality of micromirrors 21 of a digital micromirror device (DMD); in other words, the micromirrors 21 are distributed in the target area 2. Each of the micromirrors 21 deflects (swings) around a rotation axis 211 respectively to determine whether to reflect the non-radially symmetrical light beam into a projection lens assembly 3.

The target area 2 is of a rectangular form and defines an extension direction 22 which is parallel with a side of the target area 2; and the rotation axis 211 (or an imaginary extension line of the rotation axis 211) deflects from the extension direction 22 by a second angle $\theta_2$. Also, with reference to FIG. 7, the first angle $\theta_1$ included between the first pattern 122 and the second pattern 132 may be substantially equal to the second angle $\theta_2$ so that the direction in which the non-radially symmetrical light beam incident to the target area 2 has a large divergence angle is along the rotation axes 211 of the micromirrors 21. In this way, the stray light reflected from the target area 2 is less likely to propagate into the projection lens assembly 3.

In reference to FIG. 2 again, it is worth noting that, as the first lenses 121 each form an image on the target area 2 via the second lenses 131, the first cross section 121A of each of the first lenses 121 may have a shape corresponding to that of the target area 2 to reduce the light loss. Similarly, as the LEDs 1111 each form an image on the second lenses 131 via the first lenses 121, the light emitting surface 1111A of each of the LEDs 1111 may have a shape corresponding to that of the second cross section 131A of each of the second lenses 131.

Therefore, given that an aspect ratio of the target area 2 is known, a desirable aspect ratio of the first cross section 121A can be obtained; and then, according to the equation (1), a desirable aspect ratio of the second cross section 131A and a desirable aspect ratio of the light emitting surface 1111A corresponding to the second cross section 131A can be obtained.

For example, if the target area 2 has an aspect ratio of 16:9 (i.e., 1.77:1), then the first cross section 121A has an aspect ratio of 16:9 correspondingly; and then, according to the equation (1), it can be known that the second cross section 131A has an aspect ratio of about 1.125:1 and the light emitting surface 1111A of each of the LEDs 1111 also has an aspect ratio of 1.125:1 correspondingly when the first angle $\theta_1$ is 45 degrees.

In some cases, it is difficult to find LEDs 1111 that satisfy a particular aspect ratio calculated according to the equation (1) because they are not available in the market or are difficult to manufacture. A preferable solution to this problem is to choose an aspect ratio that is the closest to the calculated aspect ratio instead; e.g., if the particular aspect ratio calculated is 1.125:1, then LEDs each having a light emitting surface 1111A with an aspect ratio of 1:1 may be used as the LEDs 1111 instead.

However, using a substitute aspect ratio of the light emitting surface 1111A of each of the LEDs 1111 will require a corresponding change in the aspect ratio of the second cross section 131A of each of the second lenses 131. In this case, the area of the second cross section 131A will become different from that of the first cross section 121A.

Figure 11:
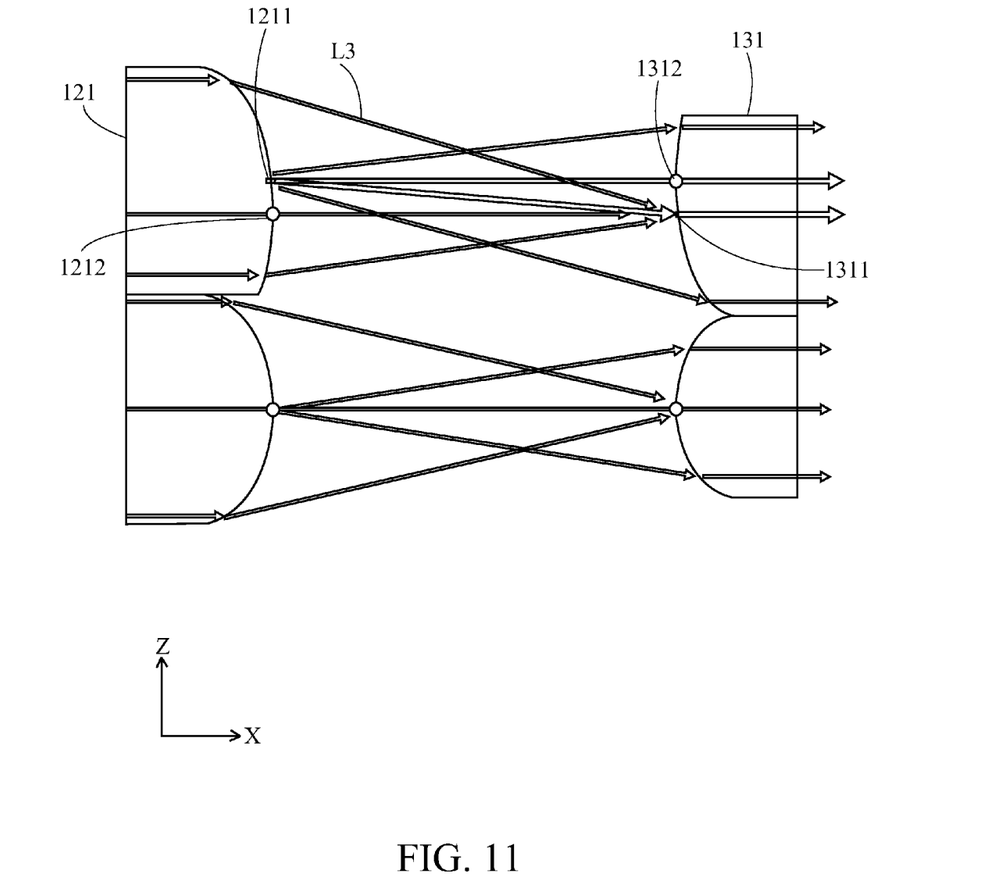
FIG. 11 is a schematic view of the first lenses and the second lenses shown in FIG. 2 after the major optical axis experiences an offset.

FIG. 11 illustrates a schematic view of the first lenses and the second lenses shown in FIG. 2 after the major optical axes experience an offset. In order to reduce the light loss occurring when the second lenses 131 and the first lenses 121 with different areas are optically coupled to each other, a major optical axis of each of the second lenses 131 is offset from the center 1311 of the second lens 131, so does a major optical axis of each of the first lenses 121.

In detail, the major optical axis of each of the second lenses 131 is offset to a vertex 1312 of the second lens 131, and the vertex 1312 is aligned with the center 1211 of one of the first lenses 121. The major optical axis of each of the first lenses 121 is offset to a vertex 1212 of the first lens 121, and the vertex 1212 is aligned with the center 1311 of one of the second lenses 131. Thus, the light rays L3 projected from the first lenses 121 in different directions can become the light rays in the same direction after passing through the second lenses 131.

Figure 12:
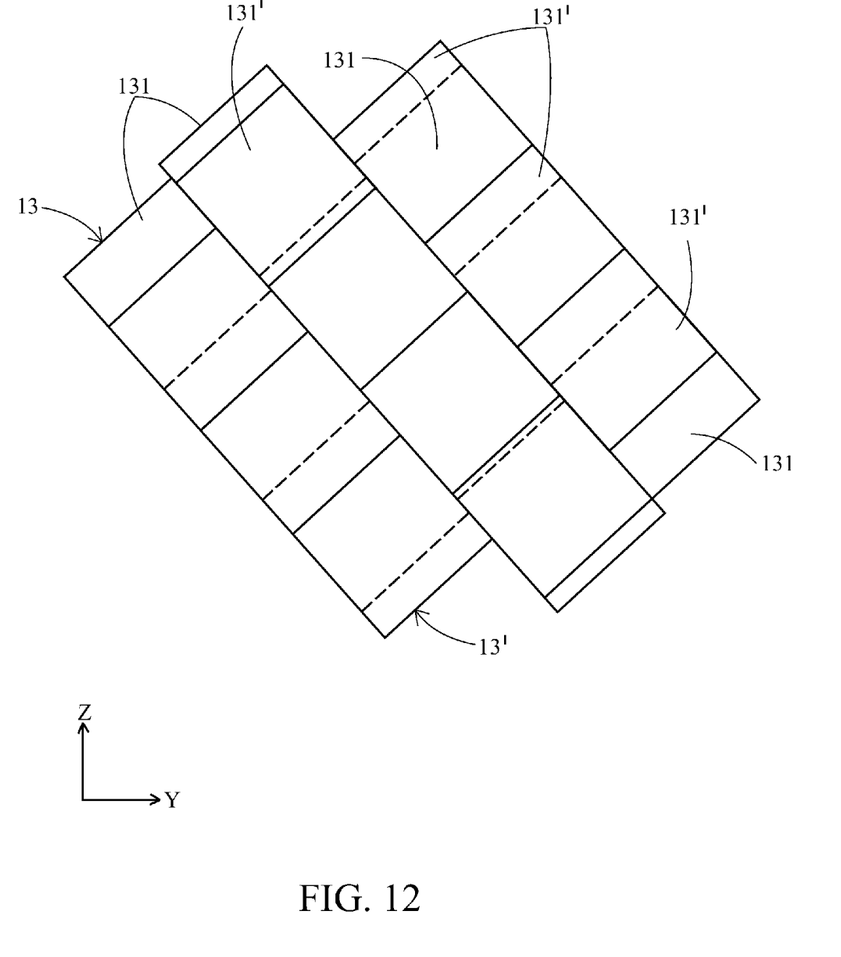
FIG. 12 is a schematic view illustrating the comparison of the second lens array shown in FIG. 2 before and after the major optical axis experiences the offset.
Figure 13:
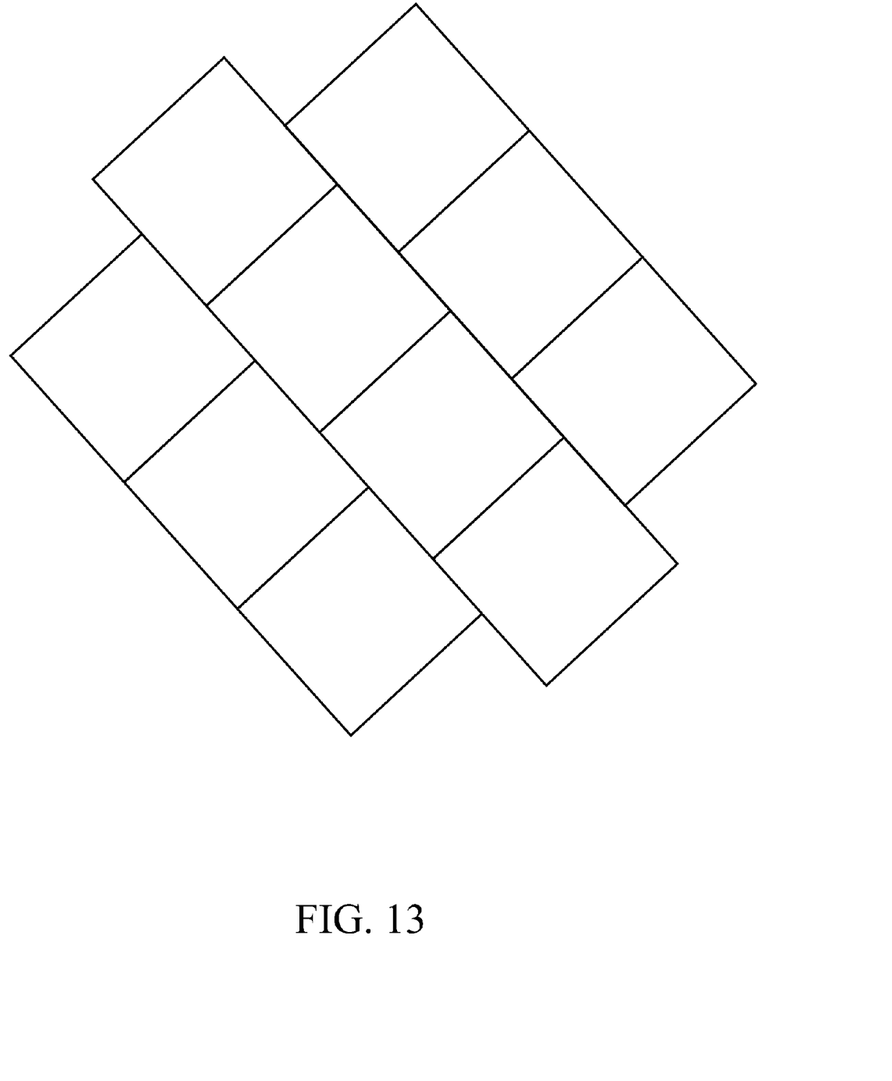
FIG. 13 is a schematic view of a non-radially symmetrical light beam generated by the second lens array shown in FIG. 12 after the major optical axis experiences the offset.

FIG. 12 illustrates another schematic view comparing the second lens array shown in FIG. 2 before and after the major optical axis experiences the offset. For convenience of the description, the second lens array and the second lenses after the major optical axis experiences the offset are denoted by 13' and 131' respectively. The offsets of the major optical axes of the second lenses 131' are almost all different from each other, and second lenses 131' located at the periphery usually have a large offset. FIG. 13 illustrates a schematic view of a non-radially symmetrical light beam generated by the second lens array shown in FIG. 12 after the major optical axis experiences the offset. The non-radially symmetrical light beam generated by the second lens array 13' has a shape corresponding to that of the second lens array 13'.

According to the above descriptions, the optical system of the present invention has at least the following advantages:

1. By arranging the first lens array and the second lens array to deflect from each other, a non-radially symmetrical light beam can be generated by the optical system without need of using special optical components;

2. The cross section of each of the first lenses may have a shape corresponding to that of the target area, and the cross section of each of the second lenses may have a shape corresponding to that of the light emitting surface of the light source module, so the light loss is reduced;

3. The first lenses and the second lenses may have the same cross section area and satisfy the equation (1), thus reducing the light loss; and 4. The major optical axis of each of the first lenses and that of each of the second lenses may be offset to reduce the light loss occurring when the first lenses and the second lenses have different section areas.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. An optical system, comprising:
a light source module;
a first lens array being located at one side of the light source module and comprising a plurality of first lenses, wherein the first lenses are arranged according to a first pattern which is non-radially symmetrical and has a first major axis, wherein the first major axis represents a direction in which the first pattern has a longer dimension; and
a second lens array being located at one side of the first lens array to be opposite to the light source module and comprising a plurality of second lenses, wherein the second lenses are arranged according to a second pattern and optically coupled to the first lenses, the second pattern being non-radially symmetrical and having a second major axis which deflects from the first major axis by a first angle, wherein the second major axis represents a direction in which the second pattern has a longer dimension;
wherein each of the first lenses has a first cross section perpendicular to a major optical axis thereof, and the first cross sections jointly form the first pattern; each of the second lenses has a second cross section perpendicular to a major optical axis thereof, and the second cross sections jointly form the second pattern;
whereby the light source module is configured to generate a telecentric light beam, and the first lens array and the second lens array are configured to transform the telecentric light beam into a non-radially symmetrical light beam towards a target area.

2. The optical system of claim 1, wherein the target area is formed by a plurality of micromirrors of a digital micromirror device, in which each of the micro mirrors is tiltable along a rotation axis, the target area being defined with an extension direction, and the rotation axis deflecting from the extension direction by a second angle which is substantially equal to the first angle.

3. The optical system of claim 1, wherein the first cross section has a shape corresponding to a shape of the target area.

4. The optical system of claim 3, wherein the first cross section and the target area are rectangular, in which the first cross section has an aspect ratio substantially equal to an aspect ratio of the target area.

5. The optical system of claim 3, wherein each of the second lenses has a second cross section with an area substantially equal to an area of the first cross section.

6. The optical system of claim 1, wherein each of the first lenses has a center correspondingly aligned with a center of one of the second lenses.

7. The optical system of claim 1, wherein each of the first lenses has a center correspondingly aligned with a vertex of one of the second lenses, and has a vertex correspondingly aligned with a center of one of the second lenses.

8. The optical system of claim 1, wherein the light source module comprises at least one LED and a collimating lens array, the collimating lens array is located at one side of the at least one LED to transform light rays emitted from the at least one LED into the telecentric light beam.

9. The optical system of claim 8, wherein the at least one LED has a light emitting surface, and the light emitting surface has a shape corresponding to a shape of the second cross section.

10. The optical system of claim 9, wherein the second cross section and the light emitting surface are rectangular, in which the second cross section has an aspect ratio substantially equal to an aspect ratio of the light emitting surface.

11. The optical system of claim 1, wherein the first pattern or the second pattern is rectangular or elliptical.

12. The optical system of claim 1, wherein the first angle is 45 degrees.

* * * * *